United States Patent [19]

Kozuki et al.

[11] Patent Number: 4,956,725
[45] Date of Patent: Sep. 11, 1990

[54] IMAGE SIGNAL REPRODUCING APPARATUS

[75] Inventors: Susumu Kozuki, Tokyo; Koji Takahashi, Kanagawa; Hiroo Edakubo, Kanagawa; Tadayoshi Nakayama, Kanagawa; Toshiyuki Masu, Kanagawa, all of Japan

[73] Assignee: Canon Kabushiki Kaisha, Tokyo, Japan

[21] Appl. No.: 89,674

[22] Filed: Aug. 26, 1987

[30] Foreign Application Priority Data

Aug. 29, 1986 [JP] Japan .................................. 61-201365
Nov. 21, 1986 [JP] Japan .................................. 61-276832

[51] Int. Cl.$^5$ .......................................... G11B 27/02
[52] U.S. Cl. .................................... 360/14.3; 360/12; 360/32; 360/72.2; 358/335
[58] Field of Search ...................... 360/10.1, 14.1, 14.3, 360/14.2, 11.1, 13, 32, 72.2, 33.1, 35.1, 9.1; 358/335, 183, 342, 22; 369/32

[56] References Cited

U.S. PATENT DOCUMENTS

| | | | |
|---|---|---|---|
| 3,825,674 | 7/1974 | Justice | 358/183 X |
| 4,591,931 | 5/1986 | Baumeister | 360/13 X |
| 4,644,401 | 2/1987 | Gaskins | 358/183 |
| 4,675,725 | 6/1987 | Parkyn | 358/183 X |
| 4,694,357 | 9/1987 | Rahman et al. | 360/32 X |
| 4,729,028 | 3/1988 | Micic et al. | 358/183 |
| 4,763,208 | 8/1988 | Kawamura et al. | 360/10.1 X |
| 4,769,721 | 9/1988 | Kajiura | 360/10.1 X |
| 4,794,464 | 12/1988 | Sasson | 360/23 X |
| 4,802,019 | 1/1989 | Harada et al. | 360/10.1 X |

*Primary Examiner*—Eugene R. Laroche
*Assistant Examiner*—Seung Ham
*Attorney, Agent, or Firm*—Robin, Blecker, Daley & Driscoll; 10

[57] ABSTRACT

An image signal reproducing apparatus for reproducing image signals from a record bearing medium on which image signals consisting of a plurality of groups of image planes are recorded is arranged to reproduce the image signals recorded on the record bearing medium; to extract, from among the reproduced image signals, representing image signals corresponding to representing image planes; to form position information signals indicative of the recorded positions on the record bearing medium of the representing image signals; and to produce the representing image signal together with the position information signals which respectively correspond to the representing image signals. The arrangement of the apparatus disclosed enables the operator to readily know the contents of the image signals recorded on the record bearing medium.

19 Claims, 6 Drawing Sheets

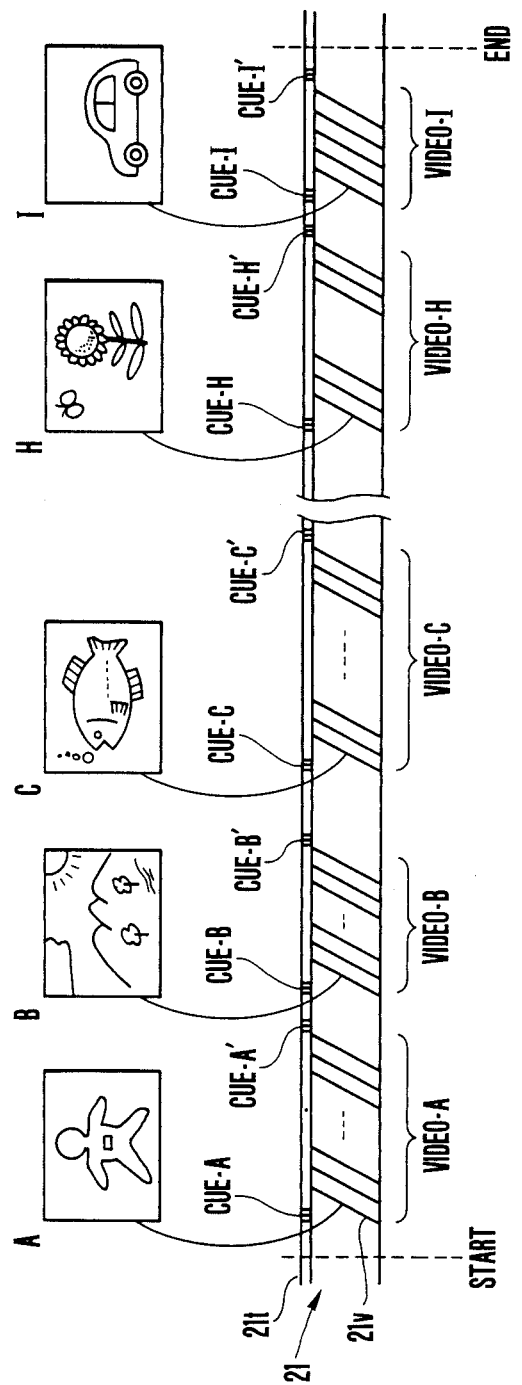
F I G. 6

IMAGE SIGNAL REPRODUCING APPARATUS

Background of the Invention:

1. Field of the Invention:

This invention relates to an image signal reproducing apparatus arranged to look up an image signal or signals recorded on a record bearing medium or to selectively produce desired image signals one after another from among image signals recorded on the record bearing medium.

2. Description of the Related Art:

An image signal reproducing apparatus such as a video tape recorder (hereinafter referred to as VTR) is arranged to perform a so-called leader finding process in looking up a group of image planes among a plurality of image plane groups recorded on a record bearing medium such as a magnetic tape. For example, a known leader finding process by fast feeding or fast rewinding the tape is arranged to be performed in the following manner: An applicable tape count value is stored beforehand at each of specific parts to be searched out by the leader finding work. The magnetic tape is allowed to travel at a high speed for fast tape feeding or rewinding. A tape counter then counts the amount of the tape. When the counted value comes to coincide with an applicable tape counted value allotted to the specific part or an specific image plane group, either reproduction is started by changing the travelling speed of the magnetic tape from the high travelling speed to a normal travelling speed or the tape is stopped from high speed travelling. In other words, either reproduction is thus allowed to begin from the leader part of the specific image plane group or the tape is brought to a stop at the leader part of the image plane group.

The above stated conventional method, however, necessitates entry of the counted values of the leaders of these image plane groups into the index or the like provided on a tape cassette. The leader finding work thus cannot be performed with ease. The work becomes more troublesome as the number of the tapes increases.

Further, in addition to the tape counted value, some credit information may be entered into the index. However, difficulty in finding the contents of the image plane groups solely from the credit information increases with time. Further, in the preparation of broadcasting programs, broadcasting stations are compelled by various reasons to have applicable scenes recorded at a plurality of parts on different tapes. Therefore, editing work on them is indispensable. It is a general practice to perform such editing work in the following manner:

An index number (such as a tape counted value) is allotted beforehand to the leader part of each of these scenes. In reproducing the record, desired scenes are looked up one after another on the basis of the index numbers. Then, editorial recording is performed with another VTR every time a desired scene is thus found.

The conventional editing method, however, has presented the following problems: In cases where there are many desired or necessary scenes, it is troublesome to make manual entry and recording of the index numbers for theses scenes. In addition to that, the contents of the desired scenes are hardly comprehensible from the index numbers. Besides, the VTR arranged for the purpose of editorial recording must be operated every time a desired scene is searched out.

Summary of the Invention:

It is a general object of this invention to provide an image signal reproducing apparatus which solves the problems of the prior art described.

It is a more specific object of this invention to provide an image signal reproducing apparatus which enables the operator to readily know the contents of groups of image planes recorded on a record bearing medium.

Under this object, an image signal reproducing apparatus which is arranged as an embodiment of this invention to reproduce image signals recorded on a record bearing medium comprises: extracting means arranged to reproduce the image signals recorded on the record bearing medium and, for each of a plurality of image plane groups constituting the image signals, to extract a plurality of representing image signals corresponding to image planes representing each group of image planes; reduced image signal forming means arranged to obtain a reduced image signal from each of the plurality of representing image signals extracted by the extracting means; and output means arranged to have reduced image planes which correspond to the plurality of reduced image signals simultaneously displayed on one and the same picture plane by producing the plurality of reduced image signals within one image plane period of said image signals.

It is another object of this invention to provide an image signal reproducing apparatus which is arranged to enable the operator to readily know the contents of groups of image planes as well as the recorded positions on a record bearing medium of image signals corresponding to the groups of image planes.

Under that object, an image signal reproducing apparatus arranged according to this invention as an embodiment thereof to reproduce image signals from a record bearing medium on which image signals consisting of a plurality of groups of image planes are recorded comprises: extracting means arranged to reproduce the image signals from the record bearing medium and to extract representing image signals corresponding to representing image planes from among the reproduced image signals; position information signal forming means arranged to form position information signals corresponding to the positions on the record bearing medium of the representing image signals extracted by the extracting means; and output means arranged to produce the representing image signals together with the position information signals corresponding to the representing image signals.

It is a further object of this invention to provide an image signal reproducing apparatus which is arranged to enable the operator to readily know the contents of each of image plane groups as well as the recorded positions on a record bearing medium of image signals corresponding to each image plane groups.

Under that object, an image signal reproducing apparatus arranged according to this invention as an embodiment thereof to reproduce image signals from a record bearing medium on which image signals are recorded comprises: extracting means arranged to reproduce the image signals recorded on the record bearing medium and, for each of a plurality of image plane groups constituting the image signals, to extract a plurality of representing image signals corresponding to image planes respectively representing different groups of image planes; reduced image signal forming means arranged to form a reduced image signal from each of the plurality of representing image signals extracted by the extracting means; position information signal forming means arranged to form position information signals corresponding to the recorded positions on the record bearing medium of the representing image signals; and output means arranged to produce a plurality of reduced image signals and a plurality of the position information signals corresponding respectively to the reduced image signals together with each other.

It is a further object of this invention to provide an image signal reproducing apparatus which enables the operator to readily know the contents of each group of image planes as well as the recorded position on a record bearing medium of image signals corresponding to the image plane group and is capable of producing only the image signals corresponding to desired groups of image signals one after another in desired order.

Under that object, an image signal reproducing apparatus arranged according to this invention as an embodiment thereof to reproduce image signals from a record bearing medium on which image signals are recorded comprises: reproducing means which has reproducing heads and is arranged to reproduce the image signals recorded on the record bearing medium by shifting the reproducing heads in relation to the position of the record bearing medium; extracting means arranged to extract a plurality of representing image signals corresponding to image planes representing each group of image planes; reduced image data forming means arranged to form reduced image data from each of the plurality of representing image signals extracted by the extracting means; position information data forming means arranged to form position information data corresponding to the recorded positions on the record bearing medium of the representing image signals; output means arranged to produce a plurality of reduced image data together with a plurality of the position information data corresponding respectively to the reduced image data; selection means for selecting desired position information data from among the plurality of position information data in desired order; and look-up output means arranged to look up and produce, from the record bearing medium, the groups of image planes including the representing image signals corresponding to the position information data one after another in the order of position information data selected by the selecting means.

The above and other objects and features of the invention will become apparent from the following detailed description of embodiments thereof taken in connection with the accompanying drawings.

Brief Description of the Drawings:

FIG. 6 is a partially pictorial view showing image information as in a state of being recorded on a magnetic tape.

Figure 1:
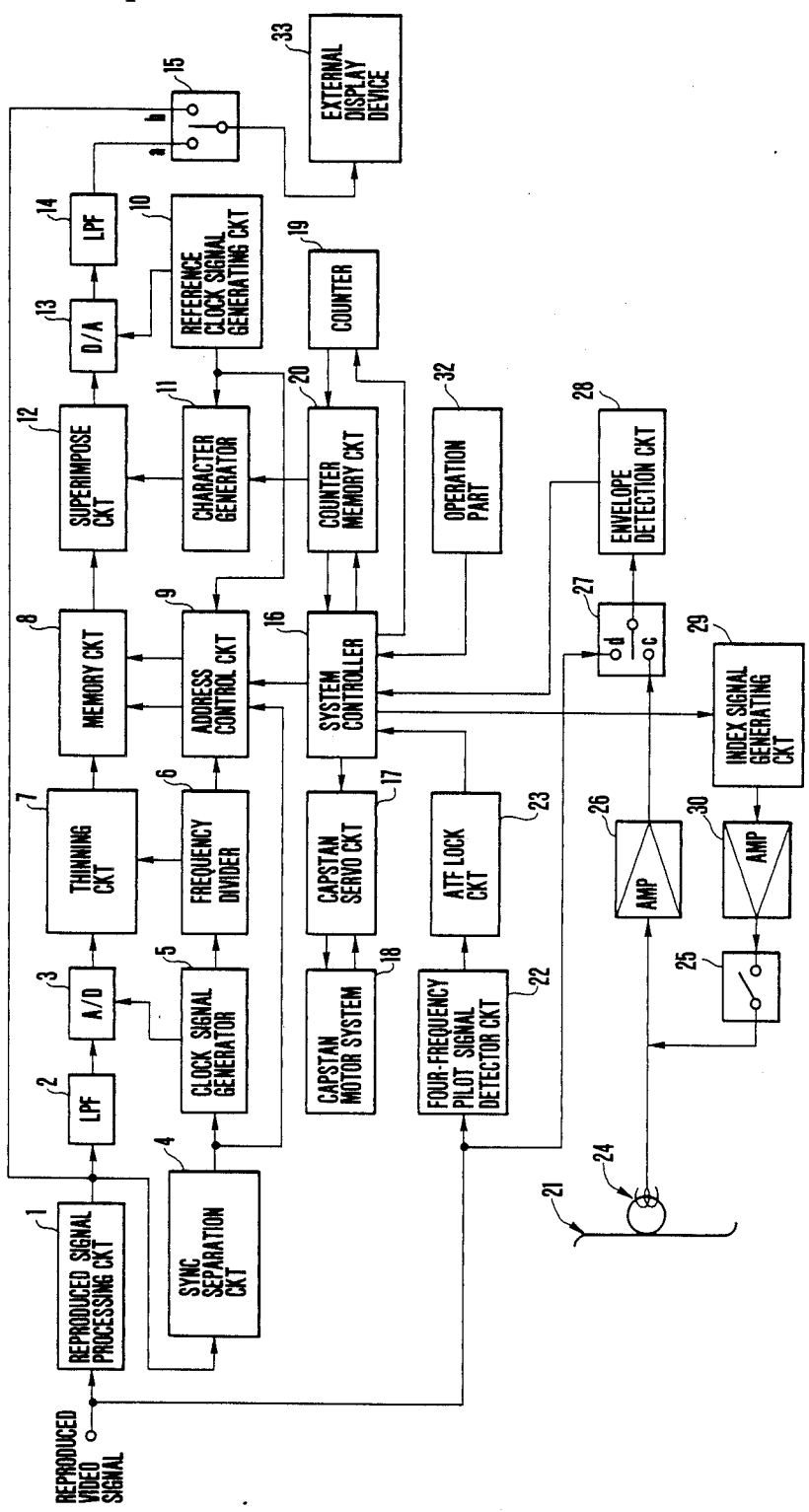
FIG. 1 is a block diagram showing a VTR arranged according to this invention as a first embodiment thereof.
Figure 2:
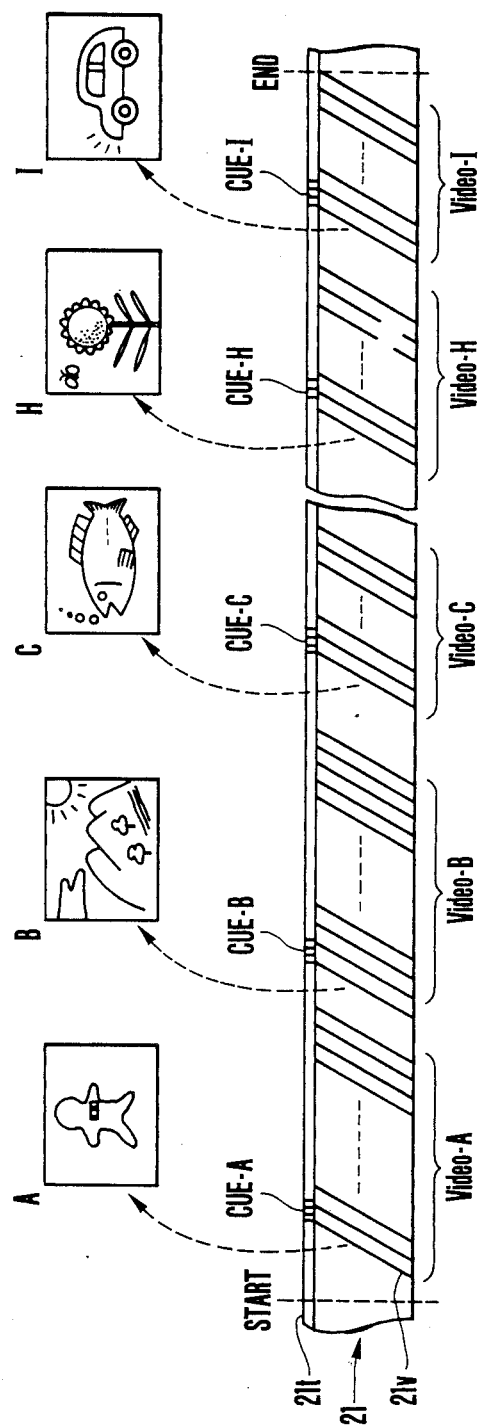
FIG. 2 is a partially pictorial view showing image information as in a state of being recorded on a magnetic tape.

Detailed Description of Preferred Embodiments:

A first embodiment of this invention is arranged as follows: FIG. 1 shows in a block diagram a VTR which is arranged according to this invention as the first embodiment thereof. FIG. 2 shows image information A to I as in a state of being recorded on a magnetic tape 21. In FIG. 2, reference symbols CUE-A to -I denote index signals indicative of start positions of video signals Video-A to -I. Reference symbols A to I denote scenes recorded at the beginning of the video signals Video-A to -I. FIGS. 3(a) to 3(d) show the timing of the operation of the first embodiment shown in FIG. 1. FIG. 4 shows still pictures displayed on a picture plane which is divided into nine parts.

Referring to FIG. 1, video signals reproduced from the magnetic tape 21 are restored into a composite color TV signal of, for example, the NTSC color system by a reproduced signal processing circuit 1. Then, the restored reproduced TV signal is supplied to a change-over switch 15 which will be described later and also to a low-pass filter (hereinafter referred to as LPF) 2. The LPF 2 is arranged to remove unnecessary signals included in the reproduced TV signal. An analog-to-digital (hereinafter referred to as A/D) converter 3 is arranged to convert the reproduced TV signal which is passed through the LPF 2 in an analog state into a digital TV signal. A sync separation circuit 4 is arranged to separate, from the TV signal, three signal components including a horizontal synchronizing signal, a vertical synchronizing signal and a color burst signal. A clock signal generator 5 is arranged to step up the horizontal synchronizing signal and the color burst signal and to generate a sampling clock signal for the A/D converter 3 and a clock signal for a thinning process which will be described later. A frequency divider 6 is arranged to frequency divide clock pulses generated by the clock signal generator 5. A thinning circuit 7 is arranged to perform a thinning process as follows: In case that the digital TV signal produced from the A/D converter 3 is to be displayed on a monitor picture plane of an external display device 33, the thinning circuit 7 thins out sampling points by selecting one picture element out of every three picture elements in the horizontal direction and one line out of every three lines in the vertical direction for the purpose of reducing the area of one image plane down to 1/9 on the picture plane. A memory circuit 8 is arranged to store the output of the thinning circuit 7. An address control circuit 9 is arranged to receive an instruction signal from a system controller 16 and to control the writing address of the memory circuit 8 on the basis of a clock signal from the frequency divider 6 and the reading address of the memory circuit 8 on the basis of a clock signal produced from a reference clock signal generating circuit 10. The address control circuit 9 is arranged to be reset in synchronism with the vertical synchronizing signal separated by the above stated sync separation circuit 4. The reference clock signal generating circuit 10 is arranged to generate the above stated reference clock signal. A character generator 11 is arranged to generate an index mark and such character data as a character or a numeral indicative of a tape counted value according to counter information read out from a counter memory circuit 20. A superimpose circuit 12 is arranged to superimpose the character data produced from the character generator 11 on the TV signal produced from the memory circuit 8 after the thinning-out process. A digital-to-analog (hereinafter referred to as D/A) converter 13 is arranged to convert the digital TV signal coming from the superimpose circuit 12 into an analog signal. An LPF 14 is arranged to remove unnecessary signal components produced during the process of D/A conversion. A change-over switch 15 is arranged to selectively produce and supply the output of the LPF 14 or the output of the above stated reproduced signal processing circuit 1 to the external display device 33.

The system controller 16 is arranged to control the address control circuit 9, a capstan servo circuit 17, a counter memory circuit 20 and an index signal generating circuit 29 o the basis of instructions received from an ATF lock circuit 23, an envelope detection circuit 28 and an operation part 32; to divide the display picture plane of the external display device 33 into nine parts; and to allot each reduced or squeezed image planes to each of the nine parts. A capstan servo circuit 17 is arranged to control each of motors included in a capstan motor system 18 to bring it into a fast feeding, reverse rotating or reproducing mode as applicable. The capstan motor system 18 includes a capstan motor and a reel motor and is arranged to rotate under the control of the capstan servo circuit 17 and to produce an FG signal for speed control. A counter 19 is arranged to measure the extent of travel of the magnetic tape from the rotating period of a reel which is not shown and to produce counter information measured. A counter memory circuit 20 is arranged to receive the counter information measured by the counter 19 and to store the counter information obtained at a point of time when an index detection signal is received from the above stated system controller 16. The illustration of FIG. 1 includes a magnetic tape 21 and a four-frequency pilot signal detector circuit 22, which is arranged to detect tracking control pilot signals of four different frequencies from the above stated reproduced video signals. An ATF lock circuit 23 is arranged to detect a stabilized state of tracking by reproducing heads (not shown) by monitoring the tracking control pilot signals detected by the four-frequency pilot signal detector circuit 22 and to cause a lock detection signal to be generated at the system controller 16 upon detection of a stabilized state of the tracking action of the reproducing heads.

A cue head 24 is arranged to record and reproduce index signals CUE-A to -I. A switch 25 is arranged to become conductive in recording the index signal. An amplifier 26 is arranged to amplify the index signal obtained from the cue head 24. A change-over switch 27 is provided for change-over from a mode "c" in which a leader finding action is to be performed on the basis of the index signal over to another mode "d" in which that action is not performed and vice versa according to the presence or absence of a cue track on the magnetic tape. An envelope detection circuit 28 is arranged to detect the envelope of the signal output of the switch 27 and to generate an index detection signal when the result of detection is above a reference level. An index signal generating circuit 29 is arranged to generate an index signal. An amplifier 30 is arranged to amplify the output of the index signal generating circuit 29. An operation part 32 is provided with keys, a board, etc. for operation. A reference numeral 33 denotes an external display device.

Figure 3:
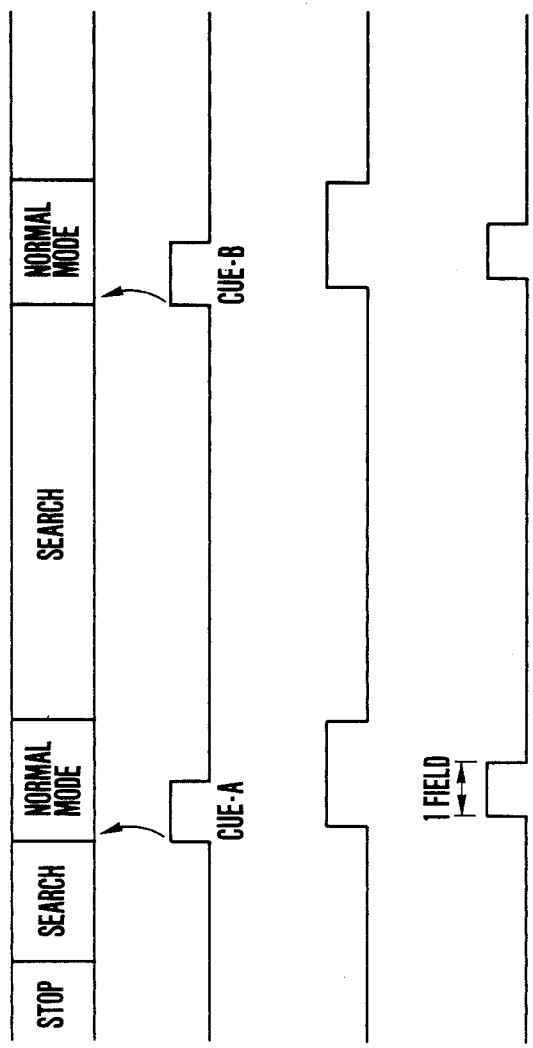
FIGS. 3(a) to 3(d) are timing charts showing a leader finding process performed by the first embodiment shown in FIG. 1.
Figure 4:
FIG. 4 is a pictorial view showing the picture plane of an external display device on which the picture plane is divided into nine parts with a still picture displayed in each of these parts.

Referring to FIGS. 2 and 3($a$) to 3($d$), the first embodiment which is arranged as described in the foregoing operates as follows:

In case a look-up action is to be performed on the magnetic tape 21 on which nine kinds of image information A to I are recorded as shown in FIG. 2: An operation key "SEARCH" which is not shown but is disposed on the operation part 32 is first pushed. As a result, an instruction for "search" is supplied to the system controller 16. The system controller 16 produces and supplies a "search" instruction signal to the capstan servo circuit 17. The connecting position of the change-over switch 15 is then shifted to one side "a" thereof. The control mode of the capstan servo circuit 17 becomes a search mode. The circuit 17 drives the capstan motor system 18 to initiate a search (or look-up) action. In this instance, the counter 19 is in a reset state and begins its counting action from a value "0000".

Further, during the search action, the cue head 24 is tracing a cue track 21$t$ which is provided in the edge part of the magnetic tape. A reproduced signal obtained by the cue head 24 is amplified by the amplifier 26. The signal thus amplified is supplied to the envelope detection circuit 28 via the switch 27 which is on its connecting side "c". When the cue head 24 comes to reproduce the index signal CUE-A, a change takes place in the envelope of the reproduced signal. This change is detected by the envelope detection circuit 28. The circuit 28 then generates an index detection signal and supplies it to the system controller 16.

Upon receipt of the index detection signal from the envelope detection circuit 28, the system controller 16 produces and supplies a "reproduction" instruction signal to the capstan servo circuit 17 to shift its control mode to a normal reproduction mode. The capstan motor system 18 is shifted to its reproduction mode.

In a reproducing part which is not shown, the reproducing head (or heads) reproduces a video signal video-A which is recorded in a video track 21$v$ on the magnetic tape. The tracking control pilot signals which is superimposed on the video signal Video-A is detected by the four-frequency detector circuit 22. When the ATF lock circuit 23 produces the ATF lock signal with a stable tracking state detected, the reproduced TV signal which has been restored to its original state by the reproduced signal processing circuit 1 begins to be subjected to the thinning process. More specifically, the reproduced TV signal is supplied via the LPF 2 to the A/D conversion circuit 3 to be converted into a digital TV signal. Then, at the thinning circuit 7, the TV signal is thinned out into a reduced TV signal which is ⅓ of an ordinary TV signal both in the vertical and horizontal directions. The reduced TV signal is then temporarily written into the memory circuit 8.

Meanwhile, the system controller 16 supplies the counter memory circuit 20 with data corresponding to a symbol "A" which is one of index sequence symbols A to I. Further, a counted value which is obtained at the counter 19 when tracking is stabilized is also stored at the counter memory circuit 20.

The reduced TV signal which is read out from the memory circuit 8 is multiplexed at the superimpose circuit 12, on the basis of data read out from the counter memory circuit 20, with an index mark generated by the character generator 11 and a signal indicative of a tape counted value. The output of the superimpose circuit 12 is then restored back to the analog TV signal by the D/A converter 13. The analog TV signal thus obtained is supplied via the LPF 14 to the change-over switch 15 which is on its connecting side "a". The analog TV signal is supplied from the switch 15 to the external display device 33. Then, at the external display device 33, a reduced still image is displayed in the middle part of the monitor picture plane. At the same time, an index symbol and a tape counted value are superimposed on the lower part of the reduced image as shown in FIG. 4.

With the reduced TV signal of the video signal Video-A stored in the memory circuit 8 and, at the same time, with the reduced still image reproduced on the external display device 33 as mentioned in the foregoing, the system control 16 produces another "search" instruction signal and supplies it to the capstan servo circuit 17. Again the search or look-up action is performed. With the search action repeated in this manner, other index signals CUE-B, -C, —are picked up one after another.

With the search action repeated as mentioned above, nine different reduced still images are eventually displayed on the monitor picture plane of the external display device 33 as shown in FIG. 4. An index symbol and a tape counted value are superimposed on each of these squeezed images in such a manner as "A−001." In the case of this embodiment, even when more than ten kinds of recorded information are searched out, the number of reduced images to be displayed in the nine-divided picture plane is limited to the first nine images.

The foregoing description of the reproducing operation is given on the assumption that the index signals CUE-A to -I are previously recorded on the magnetic tape. Further, the first embodiment is arranged to operate according to the timing of operation as shown in FIGS. 3(a) to 3(d).

Next, a look-up action for the leader of desired image information is performed as follows: For example, in searching out the leader of the video signal Video-C from the picture plane of FIG. 4, the operator first confirms, on the monitor picture plane of the external display device 33, the applicable index symbol from the index symbols superimposed on the nine reduced image planes and then reads out the applicable counted value (047 in this instance) of the video signal Video-C.

Following this, the counted value (047) is entered by operating the keys on the operation part 32 and then the operation key "search" is pushed. The system controller 16 receives a "search" instruction and in turn supplies a "search" instruction signal to the capstan servo circuit 17. The control mode of the capstan servo circuit 17 becomes a search mode. The capstan motor system 18 is driven. The instant the search action begins, the counter 19 begins to count the travelling extent of the tape. The system controller 16 compares the counted value of the counter 19 with the counted value designated by the operation part 32. When the counted value of the counter 19 becomes 047 which coincides with the counted value for the video signal Video-C, the system controller 16 supplies a "reproduction" instruction signal to the capstan servo circuit 17. The control mode of the capstan servo circuit 17 becomes a reproduction mode. The circuit 17 drives the capstan motor system 18. The instant a reproducing action begins, the connecting position of the change-over switch 15 shifts to the other side "b" thereof. Then, a reproduced video signal Video-C is supplied to the external display device 33. An image corresponding to the signal Video-C is displayed on the whole monitor picture plane of the external display device 33.

In cases where no index signal is recorded in the cue track of the magnetic tape or where no cue track is provided on the magnetic tape, the operation is performed as follows: With no index signal recorded in the cue track on the magnetic tape, desired one of the video signal Video-A to -I is detected by a fast feeding rewinding or reproducing action or the like. Then, while the record on the magnetic tape is reproduced by allowing the tape to travel, the index signals CUE-A to -I are recorded in the cue track 21t at the parts where the leaders of video signals are to be searched out. After this, the leader of a desired part of the magnetic tape can be searched out in the same manner as described in the foregoing.

In recording the index signals, an instruction for recording the index signals is given from the operation part 32 to the system controller 16. In response to this, the system controller 16 produces an instruction signal for actuating the index signal generating circuit 29. The instruction signal causes the index signal generating circuit 29 to generate and supply the above stated index signals to the amplifier 30. Since the switch 25 is arranged to be turned on by the instruction of the system controller 16 for recording the index signals, the signals amplified by the amplifier 30 are applied to the cue head 24 via the switch 25. The index signals are thus recorded in the cue track.

In the event of no cue track on the magnetic tape, the connecting position of the switch 27 is shifted to one side "d" thereof. The envelope of the reproduced video signal is monitored by the envelope detection circuit 28. When the envelope comes to suddenly change, the part at which this change takes place is considered to be a boundary between images. Then, in the same manner as mentioned in the foregoing, the system controller 16 shifts the control mode of the capstan servo circuit 17 from the search mode to the reproduction mode, so that the operation can be accomplished in the same manner as in the case of using the cue track.

The first embodiment is thus arranged to enable the operator to readily look up a desired image recorded on the record bearing medium without necessitating registration and recording of index numbers. In addition to this advantage, the embodiment enables the operator to know the contents of other images at the same time.

Figure 5:
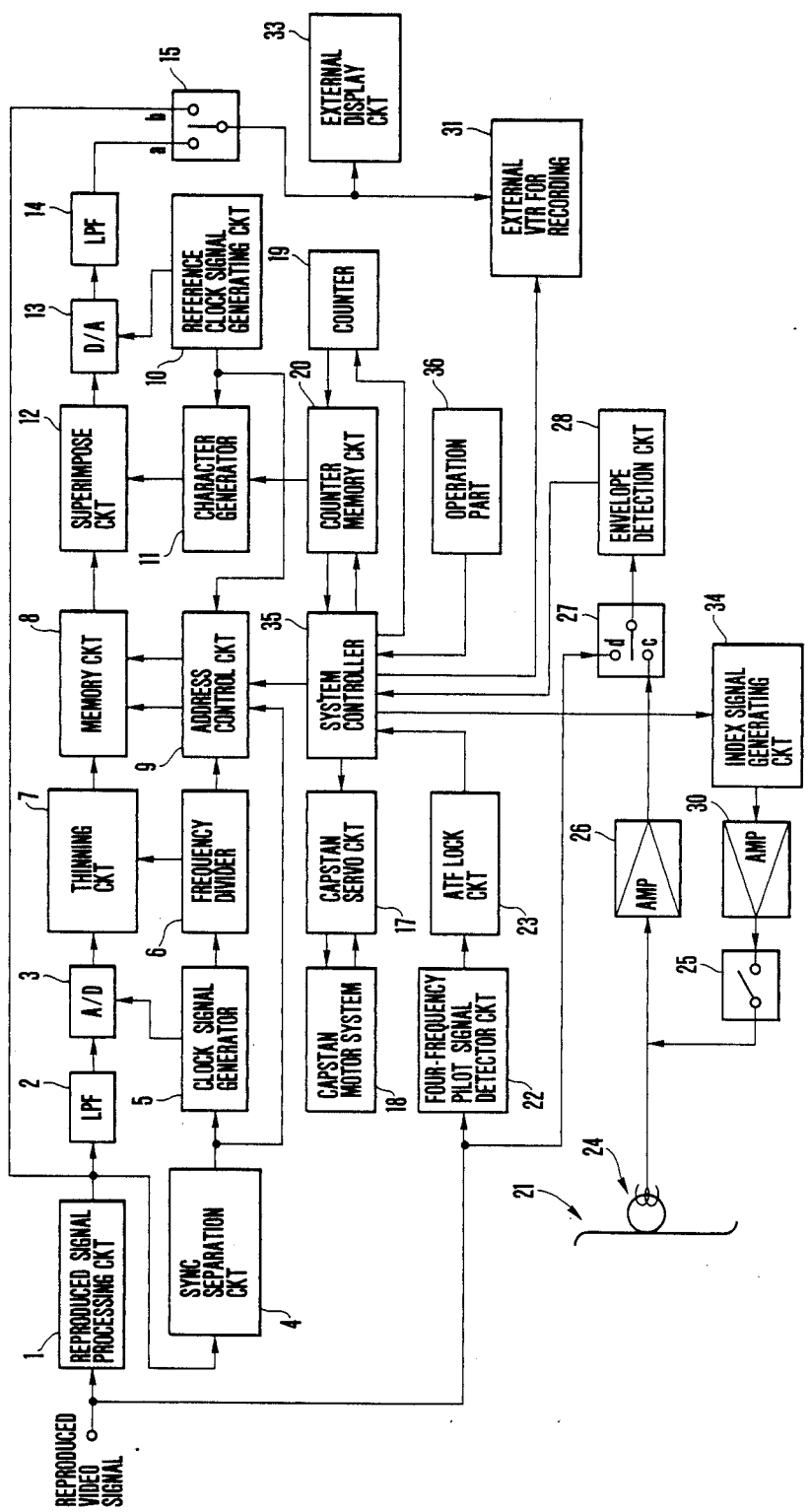
FIG. 5 is a block diagram showing a VTR arranged according to this invention as a second embodiment thereof.

A second embodiment of this invention is arranged as follows: FIG. 5 shows in a block diagram a VTR which embodies this invention as the second embodiment thereof. In the case of the second embodiment, an automatic editing function is provided with an external VTR arranged for recording in combination with the first embodiment. In FIG. 5, the same parts as those shown in FIG. 1 are indicated by the same reference numerals and the details of them are omitted from the following description. The difference of the second embodiment differs from the first embodiment shown in FIG. 1 is as follows: Referring to FIG. 6, for unedited image information A to I recorded on the magnetic tape 21, the index signals CUE-A to -I for indicating the start positions of the video signals VIDEO-A to -I and index signals CUE-A' to -I' for indicating the end positions of these video signals are arranged to be generated by an index signal generating circuit 34 and are to be recorded on the magnetic tape 21. A system controller 35 is arranged to have a function of supplying a recording control signal to an external recording VTR 31 in carrying out an automatic editing operation in addition to the same functions that are performed by the system controller 16 of the first embodiment. An operation part 36 is arranged to have a function of instructing the system controller 35 to execute an automatic editing program in the event of the automatic editing operation in addition to the same functions that are performed by the operation part 32 of the first embodiment.

Figure 7:
FIG. 7 is a timing chart showing the timing of the operation of the VTR of the second embodiment in relation to that of an external VTR used for recording.
Figure 8:
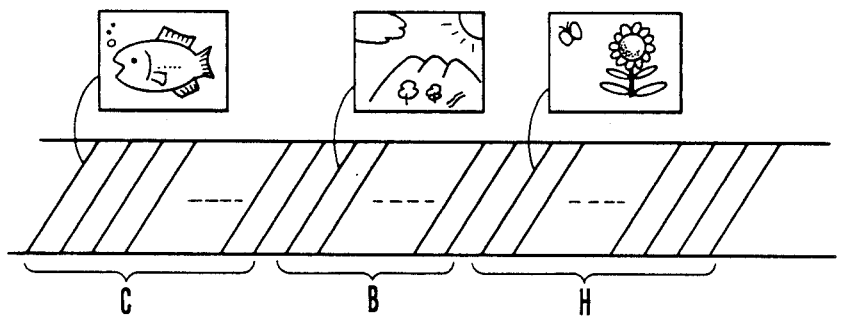
FIG. 8 is a partially pictorial view showing the result of recording made on the magnetic tape loaded on the same external recording VTR by an automatic editing operation.

Referring to FIG. 7 is a timing chart showing the operation timing of the external recording VTR 31 used for automatic editing in combination with the VTR of the second embodiment. FIG. 8 shows the state of a record obtained after automatic editing on a magnetic tape which is loaded on the external recording VTR 31.

Referring to FIG. 5, the divided display is obtained on the external display device 31 as shown in FIG. 4 in the same manner as in the case of the first embodiment. Then, desired scenes and the play-back sequence of them are selected and determined from the divided display on the picture plane of the external display device 31. The editing sequence of the result of selection is programed by instructing the system controller 35 by means of the operation part 36, for example, in such a manner as scene C - scene B - scene H. An automatic editing operation is performed according to the programed sequence.

When an instruction for automatic editing is given from the operation part 36 after completion of the program input, the system controller 35 begins to compare the present counted value counted by the counter 19 with counter information on the video signal VIDEO-C which is first designated in the above stated program. The controller 35 causes the capstan servo circuit 17 to operate the capstan motor system 18 in the search mode until the two counted values come to coincide with each other. Meanwhile, a recording control signal is supplied from the system controller 35 to the external recording VTR 31 to bring the latter into a recording stand-by state (a pause). Further, during automatic editing, the connecting position of the change-over switch 15 is kept on its side "b" by the system controller 35.

When the counter information on the video signal VIDEO-C which is stored at the counter memory circuit 20 and the counted value of the counter 19 come to coincide with each other, the system controller 35 instructs the capstan servo circuit 17 to operate in the reproduction mode and, at the same time, supplies a control signal to the external recording VTR 31 for commencement of a recording action.

The external recording VTR 31 thus begins to record a TV signal based on the reproduced video signal VIDEO-C concurrently with commencement of reproduction of the video signal VIDEO-C. Then, when the index signal CUE-C' which is recorded at the end of the video signal VIDEO-C is reproduced by the cue head 24, the system controller 35 shifts its operation mode to the "search" mode. At the same time, the external recording VTR 31 is again brought into a pause. This condition lasts until the counted value of the counter 19 comes to coincide with the counted value (or counter information) of the next video signal VIDEO-B. When the index signal CUE-H' for the video signal VIDEO-H which is in the last place within the program is reproduced, the system controller 35 produces a control signal indicative of the end of the reproducing action for automatic editing. With this control signal supplied to the external recording VTR 31, the recording action of the VTR 31 comes to an end.

FIG. 8 shows video signals C, B and H which are recorded on a magnetic tape by the external recording VTR 31 during the automatic editing operation of the second embodiment.

While the tape editing operation of the embodiment has been described by way of example in the foregoing, the invention is of course not limited to the operation of that kind but is also applicable to editing work to be carried out with other recording or reproducing apparatuses (such as an apparatus of the kind using a video disc).

As apparent from the foregoing description of the second embodiment, in accordance with this invention, any desired scenes recorded on a record bearing medium can be readily looked up without registering and recording index numbers and, in addition to that, the contents of other scenes also can be readily grasped.

It is another advantage of the embodiment of this invention that the embodiment is capable of producing for editing only the image signals of desired scenes in a desired sequence.

What is claimed is:

1. An image signal reproducing apparatus for reproducing an image signal from a recording medium on which the image signal and an index signal indicating a desired position on the recording medium have been recorded, comprising:
   (A) reproducing means for reproducing the image signal from said recording medium on which said image signal has been recorded;
   (B) extracting means for detecting the index signal recorded on said recording medium and for extracting a representative image signal of one image plane corresponding to the detected index signal from the image signal reproduced by said reproducing means;
   (C) position information signal generating means for generating a position information signal corresponding to a position on said recording medium where the representative image signal extracted by said extracting means has been recorded; and
   (D) output means for outputting the representative image signal extracted by said extracting means and the position information signal generated by said position information signal generating means.

2. An apparatus according to claim 1, wherein said extracting means includes:
   (A) index signal detecting means for detecting the index signal recorded on said recording medium, to output an index signal detecting signal; and
   (B) memory means for storing the image signal reproduced by said reproducing means in accordance with output timing of the index signal detecting signal outputted from said index signal detecting means.

3. An apparatus according to claim 2, wherein said extracting means further includes reduced image signal forming means for reducing the image signal reproduced by said reproducing means to form a reduced image signal, and the reduced image signal formed by said reduced image signal forming means is stored by said memory means in accordance with output timing of the index signal detecting signal outputted from said index signal detecting means.

4. An apparatus according to claim 1, wherein said position information signal generating means is arranged to generate a character signal for visually indicating a position information on said recording medium on which said representative image signal has been recorded.

5. An apparatus according to claim 4, wherein the output means includes time-sharing multiplexing means for effecting time-sharing multiplexing of said representative image signal and said character signal so that a character indicated by the character signal generated by said position information signal generating means is visually multiplexed with an image plane represented by the representative image signal extracted by said extracting means.

6. An image signal reproducing apparatus for reproducing an image signal from a recording medium on which a plurality of kinds of image signals corresponding to different scenes, respectively, have been recorded, comprising:
(A) reproducing means for reproducing the image signal from the recording medium on which the image signal has been recorded;
(B) extracting means arranged to monitor the image signal reproduced by said reproducing means, to detect change-over of the scene represented by the reproduced image signal and to extract a representative image signal of one image plane from the image signals reproduced by said reproducing means after the change-over of said scene;
(C) position information signal generating means for generating a position information signal corresponding to a position of said recording medium on which the representative image signal extracted by said extracting means is recorded; and
(D) output means for outputting the representative image signal extracted by said extracting means and the position information signal generated by said position information signal generating means.

7. An apparatus according to claim 6, wherein said extracting means is arranged to monitor an envelope of the image signal reproduced by said reproducing means and to output a detecting signal in the case where a variation of said envelope exceeds a predetermined range; and
memory means for storing a representative image signal of one image plane from among the image signals reproduced by said reproducing means in accordance with output timing of the detecting signal outputted by said detecting means.

8. An apparatus according to claim 7, wherein said extracting means further includes reduced image signal forming means for reducing the image signal reproduced by said reproducing means to form a reduced image signal, and the reduced image signal formed by said reduced image signal forming means is stored by said memory means in accordance with output timing of the detecting signal outputted from said detecting means.

9. An apparatus according to claim 6, wherein said position information signal generating means is arranged to generate a character signal for visually indicating a position information on said recording medium on which said representative image signal recorded has been recorded.

10. An apparatus according to claim 9, wherein the output means includes time-sharing multiplexing means for effecting time-sharing multiplexing of said representative image signal and said character signal so that a character indicated by the character signal generated by said position information signal generating means is visually multiplexed with an image plane represented by the representative image signal extracted by said extracting means.

11. An image signal reproducing method for reproducing an image signal from a recording medium on which the image signal and an index signal for indicating a desired position on the recording medium have been recorded, comprising:
(A) a first step of relatively moving a reproducing head and the recording medium at a first speed higher than a recording speed at which the recording has been effected, to reproduce the image signal recorded on the recording medium and to detect the index signal recorded on said recording medium;
(B) a second step of relatively moving the reproducing head and the recording medium at a second speed, which is equal to the recording speed, after the index signal has been detected in said first step, to reproduce the image signal recorded on the recording medium;
(C) a third step of extracting a representative image signal from among the image signals reproduced in said second step;
(D) a fourth step of generating a position information signal corresponding to a position of the recording medium on which the extracted representative image signal is recorded, after the representative image signal has been extracted in said third step; and
(E) a fifth step of relatively moving the reproducing head and the recording medium at said first speed again, after the representative image signal has been extracted in said third step, to reproduce the image signal recorded on the recording medium.

12. A method according to claim 11, in which said recording medium is a tape-shaped recording medium, and the index signal is recorded on a first area of said tape-shaped recording medium which is disposed in parallel with the longitudinal direction thereof, while the image signal is recorded on a second area of said tape-shaped recording medium which is disposed in parallel with said first area.

13. A method according to claim 11, wherein said third step includes extracting the representative image signal of one image plane in the form of a reduced representative image signal representing an image plane smaller than an original image plane.

14. A method according to claim 11, wherein said fourth step includes generating a character signal for visually indicating a position information on said recording medium on which said representative image signal has been recorded as said position information signal and effecting time-sharing multiplexing of said representative image signal and the character signal so that a character represented by said character signal is visually multiplexed with an image plane represented by the extracted representative image signal.

15. An image signal reproducing method for reproducing an image signal from a recording medium on which a plurality of kinds of image signals corresponding to different scenes, respectively, have been recorded, comprising:
(A) a first step of relatively moving a reproducing head and the recording medium at a first speed higher than a recording speed at which the recording has been effected, reproducing the image signal recorded on the recording medium, monitoring the image signal reproduced from said recording medium and then detecting change-over of scenes represented by the reproduced image signal;

(B) a second step of relatively moving the reproducing head and the recording medium at a second speed which is equal to the recording speed, after the change-over of the scenes represented by the reproduced image signals has been detected in said first step and reproducing the image signal recorded on the recording medium;

(C) a third step of extracting a representative image signal from among the image signals reproduced in said second step;

(D) a fourth step of generating a position information signal corresponding to a position on the recording medium on which the extracted representation image signal after the representative image signal has been extracted in said third step and outputting said representative image signal and said position information signal; and (E) a fifth step of relatively moving the reproducing head and the recording medium at a speed which is equal to said second speed, again and reproducing the image signal recorded on the recording medium.

16. A method according to claim 15, wherein said recording medium is a tape-shaped medium.

17. A method according to claim 15, wherein said first step includes monitoring an envelope of the image signal reproduced from said recording medium and effecting detection of a scene whereby it is judged that the change-over of the scenes represented by the reproduced image signal has been made in that a variation of said envelope has exceeded a predetermined range.

18. A method according to claim 15, wherein said third step includes extracting the extracted representative image signal of one image plane in the form of a reduced representative image signal which is smaller than an original image plane.

19. A method according to claim 15, wherein said fourth step includes generating, as said position information signal, a character signal for visually representing a position information on said recording medium on which said representative image signal has been recorded and effecting time-sharing multiplexing of said representative image signal and said character signal, whereby a character represented by said character signal is visually multiplexed with an image plane represented by the extracted representative image signal.

* * * * *